United States Patent
Sturm et al.

[15] 3,682,928

[45] Aug. 8, 1972

[54] PRODUCTION OF 2,4-DIHYDROXYQUINOLINE

[72] Inventors: Hans-Juergen Sturm, Gruenstadt; Helmut Goerth, Ludwigshafen, both of Germany

[73] Assignee: Badische Anilin & Soda-Fabrik Aktiengesellschaft, Ludwigshafen/Rhine, Germany

[22] Filed: May 19, 1969

[21] Appl. No.: 825,956

[30] Foreign Application Priority Data

May 22, 1968 Germany..........P 17 70 480.2

[52] U.S. Cl........260/283 SY, 260/289 R, 260/471 R
[51] Int. Cl. ............................................C07d 33/38
[58] Field of Search ....................260/289 R, 283 SY

[56] References Cited

UNITED STATES PATENTS 3,025,299   3/1962   Pfister et al................260/289

FOREIGN PATENTS OR APPLICATIONS 488,203     11/1952   Canada......................260/289
40/18110    8/1965    Japan ........................260/289
1,509,468   2/1968    France.......................260/289

*Primary Examiner*—Donald G. Daus
*Attorney*—Johnston, Root, O'Keeffe, Keil, Thompson & Shurtleff

[57] ABSTRACT

Production of 2,4-dihydroxyquinoline starting from N-acetoacetylanthranilic acid esters.

3 Claims, No Drawings

PRODUCTION OF 2,4-DIHYDROXYQUINOLINE

This invention relates to a process for the production of 2,4-hydroxyquinoline.

We have found that 2,4-dihydroxyquinoline can be prepared in a very advantageous way by converting a N-acetoacetylanthranilic acid ester having the general formula (I):

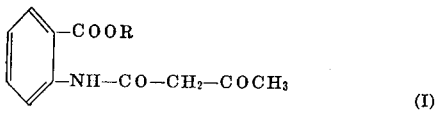

where R denotes an alkyl radical having from one to four carbon atoms, by means of aqueous alkali or alkaline earth into the alkali metal or alkaline earth metal salt of 3-acetyl-2,4-dihydroxyquinoline or by means of additional acidification into 3-acetyl-2,4-dihydroxyquinoline having the formula (II):

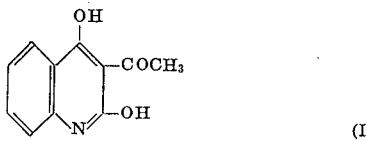

and deacetylating this product to 2,4-dihydroxyquinoline.

Examples of the radical R are methyl, ethyl, n-propyl, isopropyl, n-butyl or isobutyl, methyl and ethyl being preferred.

Compounds having the general formula (I) are acessible easily and in excellent yields form the corresponding anthranilic esters by reaction with diketene.

Examples of alkalies or alkaline earths are: sodium hydroxide, potassium hydroxide, calcium hydroxide and barium hydroxide, sodium hydroxide being preferred.

Ring closure to form the compounds having the formula (II) takes place in aqueous alkali which contains for example from 1 to 10 equivalents, preferably from 1.5 to 6 equivalents, of alkali metal hydroxide or alkaline earth metal hydroxide per mole of the compound having the formula (I). The alkali metal salt or alkaline earth metal salt of 3-acetyl-2,4-dihydroxyquinoline is first formed in the reaction and this may be converted into 3-acetyl-2,4-dihydroxyquinoline by acidification.

Deacetylation to 2,4-dihydroquinoline is carried out in a strong acid or in alkaline solution.

Examples of strong acids are hydrobromic acid, perchloric acid, phosphoric acid or preferably sulfuric acid. When sulfuric acid is used, for example 5 to 10 times, preferably from 6 to 8 times the amount of 50 percent to 96 percent, preferably from 70 percent to 90 percent, acid is added.

Sodium hydroxide, potassium hydroxide or calcium hydroxide may be used for example for deacetylation in alkaline solution, the deacetylation temperature being above 100° C, preferably above 140° C. When using aqueous alkaline solutions it is therefore necessary to use pressure resistant vessels. The use of pressure vessels may be avoided however by wholly or partly replacing water by a solvent of higher boiling point, such as alcohols, glycols or glycol ethers. Examples are diethylene glycol, triethylene glycol, methyl diglycol or ethyl diglycol.

A convenient method for the production of 2,4-dihydroxyquinoline consists in introducing the N-acetoacetylanthranilic ester into water at room or higher temperature (for example 80° C) and then running in caustic alkali solution. The whole is stirred for half an hour to 2 hours at from 70° to 100° C.

When the deacetylation is to be carried out in alkaline solution, the reaction temperature is then raised to 130° to 190° C, preferably from 150° to 170° C, and the reaction mixture is kept at this temperature for from 2 to 10, preferably 4 to 8, hours. For ring closure and deacetylation it is advantageous to use from 2 to 10, preferably 4 to 6, equivalents of alkali metal hydroxide or alkaline earth metal hydroxide per mole of the compound having the formula (I), added all the once at the beginning of the reaction or preferably in several portions. The concentration of the alkaline solutions should preferably be from 1.5 to 5N. Deacetylation in alkaline solution makes it possible, starting from compounds having the formula (I), to carry out the production of 2,4-dihydroxyquinoline in a single vessel, and the product can be isolated as the alkali metal or alkaline earth metal salt.

If deacetylation is to be carried out in strong acid, it is advantageous to precipitate the reaction product present after ring closure by adding acid and thus isolating it as 3-acetyl-2,4-dihydroxyquinoline. The 3-acetyl-2,4-dihydroxyquinoline is then added to sulfuric acid and the resulting suspension is heated. After about half an hour to 3 hours heating at a temperature of from about 90° to 130° C, the reaction mixture is allowed to flow into water and the precipitated reaction product 2,4-dihydroxyquinoline is isolated and dried.

The acetyldihydroxyquinoline may be reacted dry or moist, any water present being compensated for by adding appropriate amounts of concentrated acid so that the acid concentration in the suspension amounts to from 70 to 90 percent after the mixing.

Cyclization of ethyl acetoacetylanthranilate to 3-acetyl-2,4-dihydroxyquinoline by heating in alcoholic caustic potash solution (K. Ogura, H Sazaki, S. Seto, Bl. chem. Soc. Japan, 38, 306 (1965)) and of the methyl ester by boiling with sodium in toluene or by heating for several hours with sodium methylate in methanol and ether (R. Lacey, J. Chem. Soc., London, 1954, 850) is known. It is very surprising that the ring closure can also be achieved in dilute aqueous caustic alkali solution, and indeed under conditions which are normally chosen for hydrolyzing esters.

As compared with conventional industrial method for the production of 2,4-dihydroxyquinoline in which N-acetylanthranilic acid is cyclized in an anhydrous melt of sodium hydroxide and potassium hydroxide which contains a considerable amount of sodamide at temperatures of from 150° to 180° C (see BIOS 1153, 323), the new process offers great advantages. In the prior methods the melt has to be very carefully dehydrated prior to the actual reaction and similarly the N-acetylanthranilic acid has to be absolutely dry because sodamide reacts explosively with moisture. Moreover the melt has a strong corrosive effect. In contrast, the new process is more economical and less complicated, and it does not require any special safety precautions whatever in carrying it out.

It is very surprising that in deacetylation in alkaline solution in the absence of solubilizers, the reaction will only proceed when caustic alkaline solutions are used which are not too concentrated; for example caustic alkali solutions having a content of more than 50 percent of alkali are inactive.

The invention is illustrated by the following Examples. Parts and percentages specified in the following Examples relate to weight.

EXAMPLE 1

250 parts of ethyl-N-acetoacetylanthranilate is added to 1800 parts of water at 80° C so that the ester melts. The whole is heated to 90° C, 160 parts of 50 percent caustic potash solution is run in and the whole is stirred for 1 hour at this temperature. Then it is cooled to about 70° C, slightly acidified with dilute sulfuric acid, further cooled to about 40° C and the precipitate is suction filtered and washed until neutral. 436 parts of moist 3-acetyl-2,4-dihydroxyquinoline is obtained having a water content of 58 percent, i.e. a yield of 89.5 percent of the theory calculated as dry product.

The moist 3-acetyl-2,4-dihydroxyquinoline is introduced into 915 parts of concentrated sulfuric acid in such a way while stirring well that the temperature does not rise above 100° C. After all has been added, the mixture is heated to 125° C, stirred for 2 hours at this temperature and then allowed to flow into 3,300 parts of water. The whole is allowed to cool, the precipitate is suction filtered, washed until neutral and dried. 138 parts of 96 percent 2,4-dihydroxyquinoline is obtained, i.e. a yield of 91 percent of the theory.

EXAMPLE 2

755 parts of methyl anthranilate and 450 parts of diketene are caused to react at 120° C. The liquid reaction product is allowed to flow into 9,500 parts of water, the mixture is heated to 90° to 100° C and 600 parts of concentrated caustic soda solution is slowly added. The whole is stirred for 2 hours at about 95° C, cooled to about 60° C and adjusted to pH 4 with concentrated sulfuric acid. The whole is then stirred for half an hour and the reaction product is suction filtered, washed until neutral and dried. 888 parts of 3-acetyl-2,4-dihydroxyquinoline having a melting point of from 245° to 248° C is obtained, i. e. 87.7 percent of the theoretical yield.

406 parts of 3-acetyl-2,4-dihydroxyquinoline is added to 2,400 parts of 80 percent sulfuric acid, and the mixture is heated to 120° to 130° C and stirred for 2 hours at this temperature. The reaction mixture is then cooled to 100° C and run into 7,200 parts of water. After the aqueous suspension has been stirred for half an hour, the reaction product is suction filtered, washed until neutral and dried. 313 parts of 98.1 percent 2,4-dihydroxyquinoline is obtained, i.e. 95 percent of the theory.

EXAMPLE 3

470 parts of methyl acetoacetylanthranilate and 800 parts of 50 percent caustic soda solution are added to 3,500 parts of water at about 80° C in a stirred pressure vessel. The whole is stirred for half an hour at 90° to 100° C, then heated to 160° C, stirred for 6 hours at this temperature, cooled, the reaction mixture diluted somewhat with water and acidified. The precipitate is suction filtered, washed until neutral and dried. 290 parts of 96 percent 2,4-dihydroxyquinoline is obtained.

EXAMPLE 4

The procedure of Example 3 is followed but only 3,000 parts of water is used. After the reaction is over the product is not diluted and acidified but the sodium salt of dihydroxyquinoline is allowed to crystallize out completely. 500 parts of moist filter cake is obtained having a content of 58 percent of the sodium salt of dihydroxyquinoline, equivalent to 289 parts of 100 percent the sodium salt of 2,4-dihydroxyquinoline.

EXAMPLE 5

400 parts of ethyl anthranilate is caused to react at from 110° to 130° C with 210 parts of diketene. The reaction product is run as a liquid into an autoclave filled with 4,750 parts of water. The whole is heated at 80° to 90° C and 660 parts of about 50 percent caustic potash solution is added. The whole is stirred for 1 hour at 90° C, then heated slowly to 170° C, stirred for another 5 hours at this temperature, cooled, diluted with a little water and acidified. The precipitate is suction filtered, washed until neutral and dried. 343 parts of 94 percent 2,4-dihydroxyquinoline is thus obtained.

EXAMPLE 6

377 parts of methyl anthranilate is allowed to react with 255 parts of diketene at about 120° C. The liquid reaction product is run off while hot into an autocalve containing a suspension of 600 parts of quicklime in 4,700 parts of water at 80° C. After stirring for 1 hour at 90° C, the whole is heated to 180° C, stirred for 8 hours at this temperature, cooled to room temperature and the precipitate is suction filtered. The moist filter cake is stirred into hot 5 percent caustic soda solution and the mixture is filtered. The filtrate is acidified. After suction filtration, washing and drying, 244 parts of 89 percent 2,4-dihydroxyquinoline is obtained.

EXAMPLE 7

A mixture of 117 parts of methyl acetoacetylanthranilate and 420 parts of methyl diglycol is heated to 85° C in a stirred flask having a superimposed distillation bridge. 200 parts of about 50 percent caustic soda solution is then run in slowly at such a rate that the internal temperature does not exceed 95° C. The whole is stirred for 90 minutes at 95° C and the temperature is then slowly raised to 175° C so that a mixture of methanol, water and some methyl diglycol distils off. The contents of the flask are stirred for 4 hours at 175° C, then cooled to about 100° C and about 300 parts of water is added. The whole is made clearly acid with hydrochloric acid, cooled to room temperature, suction filtered, washed until neutral and dried. 68 parts of 92 percent 2,4-dihydroxyquinoline is obtained.

We claim:

1. A process for the production of 2,4-dihydroxyquinoline which comprises forming the alkali or alkaline earth metal salt of 3-acetyl-2,4-dihydroxyquinoline by reacting a compound of the formula

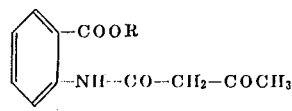

wherein R is alkyl of one to four carbon atoms, with from 1 to 10 equivalents of alkali or alkaline earth metal hydroxide in aqueous solution at a temperature of about 70° C. to 100° C., acidifying said alkali or alkaline earth metal salt into 3-acetyl-2,4-dihydroxyquinoline and then deacetylating said 3-acetyl-2,4-dihydroxyquinoline by reaction with a concentrated acid selected from the group consisting of sulfuric acid, hydrobromic acid, perchloric acid and phosphoric acid at a temperature of about 90° C. to 130° C. to form 2,4-dihydroxyquinoline.

2. A process as claimed in claim 1 wherein said hydroxide is sodium hydroxide.

3. A process as claimed in claim 1 wherein said concentrated acid used for deacetylating said 3-acetyl-2,4-dihydroxyquinoline is sulfuric acid.

* * * * *